United States Patent [19]
Hendrickson et al.

[11] 3,765,367
[45] Oct. 16, 1973

[54] PROPULSION SYSTEMS

[75] Inventors: Ellis C. Hendrickson, Seattle; Edward J. Rupnick, Renton, both of Wash.

[73] Assignee: The United States of America as represented by the Secretary of the Army, Washington, D.C.

[22] Filed: Nov. 24, 1970

[21] Appl. No.: 92,470

[52] U.S. Cl. ............................................. 115/1 R
[51] Int. Cl. ............................................. B60f 3/00
[58] Field of Search ..................... 115/1, 1 R, 1 B, 115/42; 9/1 T

[56] References Cited
UNITED STATES PATENTS

| | | | |
|---|---|---|---|
| 2,139,594 | 12/1938 | Kort | 115/42 |
| 2,514,488 | 7/1950 | Hale et al. | 115/1 R |
| 3,469,553 | 9/1969 | Gagne | 115/1 R |
| 3,403,654 | 10/1968 | Wilson | 115/1 R |
| 2,376,647 | 5/1945 | Akins | 115/1 R |
| 2,892,503 | 6/1959 | Hood et al. | 115/34 |

*Primary Examiner*—Duane A. Reger
*Assistant Examiner*—Jesus D. Sotelo
*Attorney*—Harry M. Saragovitz, Edward J. Kelly, Herbert Berl and Robert M. Lyon

[57] ABSTRACT

An amphibious vehicle comprising ducted-propeller units providing for an increase in water speed, a reduction in forward turning diameter, and backing turns within the vehicle length with full steering control. The water propulsion means is so arranged as to employ the same prime mover and associated power transmission and power control means that is used for land locomotion.

3 Claims, 3 Drawing Figures

INVENTORS
ELLIS C. HENDRICKSON
EDWARD J. RUPNICK
BY
Harry M. Saragovitz
Edward J. Kelly, Herbert Berl
& Robert P. Lyon
ATTORNEYS

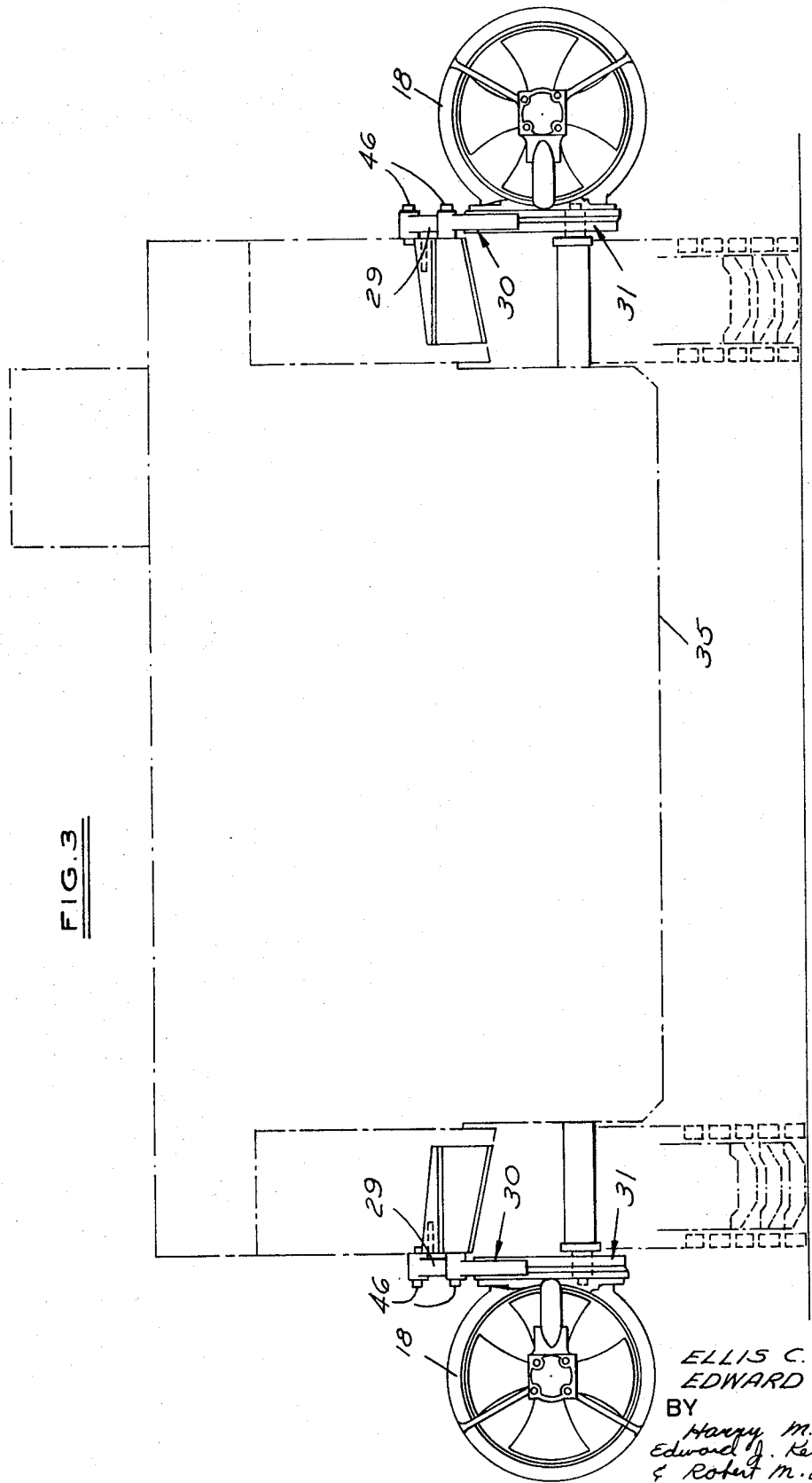

PROPULSION SYSTEMS

BACKGROUND OF THE INVENTION

1. Field of the Invention

The present invention pertains to amphibious vehicles, and more particularly a marine propulsion system for land vehicles such as tracked military vehicles.

2. Description of the Prior Art

Prior art vehicles of the type referred to hereinbefore, as well as land vehicles including a hybrid or half-track using both wheels and a crawler track, have employed various means to propel the vehicle both on water and on land.

One such system has utilized propellers and conventional land wheels, requiring separate complex drive trains, including many gears and other controls, for each propulsion system. In another case, a water jet propulsion apparatus has been proposed for amphibious vehicles claiming to give the vehicle highly efficient maneuverability in the water while achieving near optimum efficiency during normal land propulsion.

SUMMARY OF THE INVENTION

The present invention provides an improved and novel water propulsion means for a self-propelled amphibious vehicle arranged so as to employ the same prime mover and associated power transmission and power control means that are used for land locomotion. The sprocket driven ducted-propeller units consist of a housing structure containing a planetary speed up gearset mounted coaxially to the track sprocket. From this is driven a miter gear box which drives the ducted propeller.

It has been determined that where use of the common power transmission means results in concurrent operation of the land propulsion elements, such as wheels or tracks, the water propulsion means is devised to achieve a water speed that would be attained by these wheels or tracks when on land. This is of particular importance to the control of the amphibious vehicle in the critical stage of egressing from a moving stream or from the surf onto a steep beach.

To achieve directional and speed control in the water this invention may utilize the same steering means used for the land mode of propulsion and control On tracked vehicles, where differential track speeds are used for steering, this same means may be employed by speed-responsive water propulsion devices. On articulated vehicles, steered by turning segments of the vehicle, the water propulsion force is redirected for steering by the same action. The same steering action may be achieved when the water propulsion means is secured to a steerable wheel on a wheeled vehicle.

The water propulsion means may be any of a class of such standard devices which are driven by mechanical power and produce thrust by accelerating the water in which the vehicle is immersed. This thrust is controlled by variations of input speed and direction.

The preferred mounting for the propulsion device is in juxtaposition with an exterior, powered, land locomotion element, such as the track drive sprocket, or drive wheel from which the water propulsion system is powered. Structural connections from the propulsion device to the vehicle are provided to transmit its thrust and react its driving forces where necessary.

Power connection is made through a class of standard engaged and disengaged power transmission devices such as a dog clutch or splined couplings. Connection is thereby made to the power train at or near the final driving elements to retain a requisite portion of the braking, steering and speed changing capabilities of the land locomotion power driving train.

The propulsive means may be manually positioned, installed, engaged, and structurally secured for use. An alternative embodiment may have this propulsive means permanently installed on the vehicle and positioned, engaged, and secured in the operating or stowed position, manually, or by powered means which are locally or remotely controlled.

The sprocket-driven ducted-propeller system provides a marked improvement in waterborne performance. The vehicle's speed is increased from 4 miles per hour to 6.5 miles per hour. The yawing action is stabilized by front-sprocket-driven propellers so that a steady course may be held without frequent steering. The propellers provide its craft with a highly controllable maneuverability. Ducted propellers have several inherent advantages over equally efficient open screws. Primarily the overall diameter is 19 percent to 22 percent smaller. The engine torque requirement under static pull conditions increases only by about 6 percent, while that of an open screw rises 22 percent. Consequently the nozzle propeller is able to sustain greater static thrusts. Finally, the nozzle ring also forms a guard for its impeller.

Other advantages of the present invention will become apparent to those of ordinary skill in the art by the following description when considered in relation to the accompanying drawings.

BRIEF DESCRIPTION OF THE DRAWINGS

FIG. 3 is a front elevation taken on line 3—3 of FIG. 1.

DESCRIPTION OF THE PREFERRED EMBODIMENT

Figure 1:
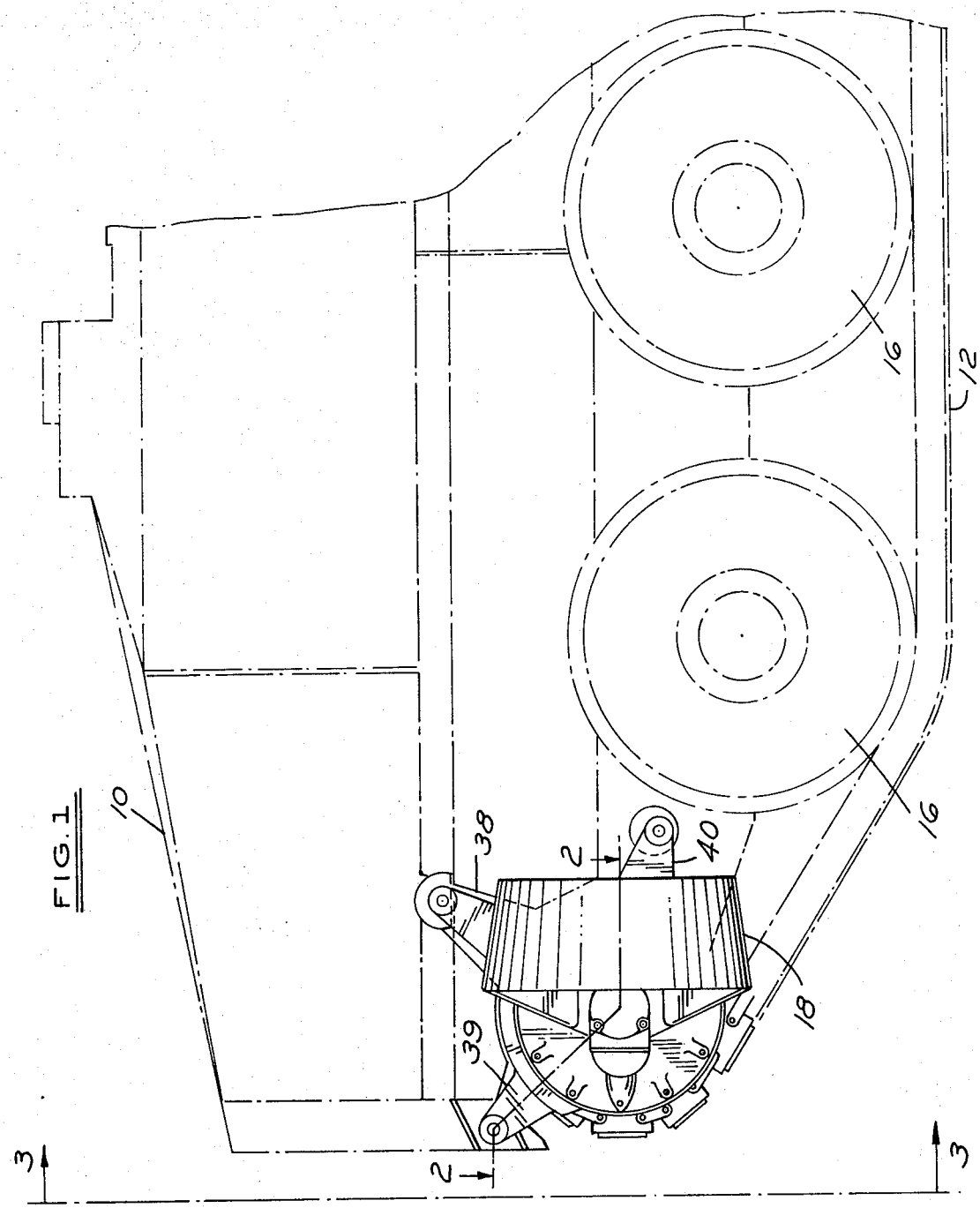
FIG. 1 is a side elevational view of the forward end of an amphibious vehicle embodying preferred teachings of our invention.

Referring now to the accompanying drawings, wherein like reference numerals denote corresponding parts throughout the several views, numeral 10 designates the forward portion of amphibious military vehicle which travels on land on a pair of tracks 12 positioned along opposite sides of vehicle 10. Each track 12 comprises an endless link assembly of the general type riding on sprocket wheels, not shown on the drawings, at the extreme forward or rear ends of travel and a group of bearing wheels 16 indicated in phantom.

Vehicle 10 has standard drive mechanism for tracked vehicles, i.e., a combustion engine means, not shown in the drawings, for driving the vehicle connected through suitable power transmission means to tracks 12 to drive them.

Figure 2:
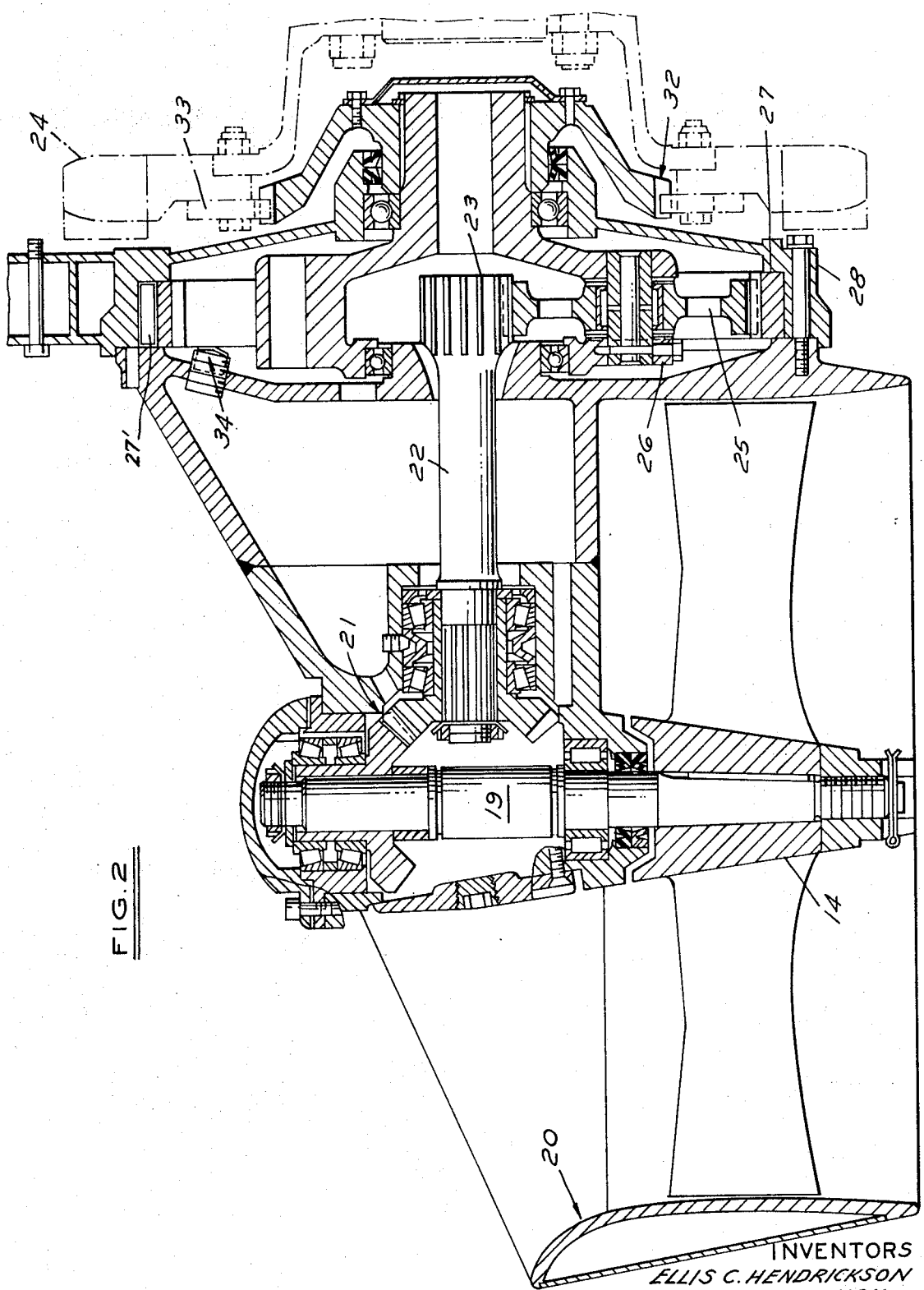
FIG. 2 is a fragmentary section view taken along the line 2—2 of FIG. 1.

The sprocket-driven propulsion system, as shown in FIG. 2, is comprised of two four-bladed propellers 14, each supported and housed in its own kort nozzle 18.

Each bronze propeller 14 mounts on and is driven by a keyed tapered drive shaft 19. Propeller 14 rotates inside the cast aluminum strut supported nozzle duct or faired ring 20 drawing water in the front of kort nozzle 18 and expelling it out the rear. Propeller 14 and its drive shaft 19, positioned substantially parallel to the longitudinal center of vehicle 10, are driven by a 1:1 right angle bevel gear set 21. Input bevel gear drive shaft 22 is also output spur gear 23 of an 8:1 planetary spur gear set, comprised of a subassembly consisting of gear 23, planets 25, ring gear 27, carrier 26 and related shafts, bearings, fastenings, hereinafter referred to as "planetary gear train 23–25–27", located concentric with track drive sprocket 24. Lubrication for the bevel gears is provided by oil scoop 34 which diverts oil contained in planetary gear housing 28 and circulated by rotating planet carrier 26.

The power input into the planetary gear train is to planet carrier 26. Output sun gear 23 is permitted to float in its engagement with the planetary gears, one of which is shown at 25 in order to equalize the gear tooth loading. The reaction member of planetary gear train 23–25–27–is ring gear 27, which is keyed at 27' to the fabricated aluminum planetary housing 28 and torque reaction arms 29, 30 and 31. Planet carrier 26 has a male keyed or dog type clutch 32 input, which mates with a female unit 33 bolted to track drive sprocket 24 which that sprocket drives to transmit power to propeller 14. Nozzle propeller device 18 is sized to produce a given thrust and water speed at a specific sprocket velocity based upon anticipated vehicle water resistance. Nozzle propeller device 18 is driven mechanically through an appropriate gear train or other mechanical, hydraulic or electrical power transmission device, concentrically, or otherwise, and by a dog clutch 32 or other type clutch or drive on the drive shaft 19 or idler sprocket wheel, not shown in the drawings, of amphibious vehicle 10 or the steering drive wheels of a wheeled vehicle. Housing 28 is mounted onto amphibious vehicle 10 on hull 35 to react track drive sprocket 24, induced torque loads and propeller 14 induced fore and aft thrust loads and propeller 14 torque reaction loads. Nozzle propeller device 18 can also be mounted by a rigid connection of carrier 26 to track drive sprocket 24 of a tracked vehicle or the steering drive wheel on a wheeled vehicle for support of housing 28, providing a reaction point for the fore and aft thrust loads, but the torque loads must still be reached by connecting housing 28 to the frame or structure. Nozzle propeller device 18 is designed to be driven at that sprocket or drive wheel speed, which on a tracked vehicle, makes the track run at land speed in the water in order to minimize loss of vehicle control at the water-land interface resulting from a large disparity between vehicle speed through water and track speed with respect to land. This synchronism of track speed and water speed also minimizes the drag of the vehicle in the water.

The novel sprocket-driven propeller 14, as described in my invention, is controlled and powered in the water, in both speed and direction, by the same power transmission control mechanisms used to propel, steer and control the vehicle on land.

The sprocket-driven shrouded propeller system will retain track system advantages while surmounting its drawbacks. The vehicle steering control and power-supply transmission are utilized in their normal manner as with the track system and consequently duplication of equipment and function is avoided.

In order to generate maximum engine power while minimizing power absorption by the track it is desirable to operate the transmission in first gear. Propeller rotative speeds in about the range from 900 rpm to about 1,400 rpm are desirable for effective thrusts in practical sized units. To match these speeds to about 113 rpm of sprocket wheels 24 without internal change of the drivng machinery of the vehicle that is used for land propulsion along with speed and directional control, is the function of the above-described planetary gear train; in the illustrated environment, the planetary power train serves as a speedup gear train.

Three radiating arm members 38, 39, 40 extend from gear case member 28 for securing propeller device 14 to vehicle 10 by means of suitable fasteners such as screws 46.

The propulsive means may be manually installed and positioned, engaged, and structurally secured for use. If desired, the propeller system may be permanently installed on the vehicle and positioned, engaged, and secured in the operating or stowed position.

We wish it to be understood that we do not desire to be limited to the exact details of construction shown and described, for obvious modifications will occur to a person skilled in the art.

What we claim is:

1. An amphibious motor vehicle, propulsion means to provide land locomotion comprising an endless track on each side of the vehicle, a drive sprocket for each track in engagement with its track and mounted on the side of and adjacent one end of the vehicle, an engine, and a transmission drivingly connecting the engine and the tracks; a propulsion device for each side of the vehicle mounted in close proximity to and on one side of a drive sprocket for selective forward or rearward thrust and comprising a nozzle-propeller, drive means connecting the nozzle-propeller with its associated sprocket and including a keyed tapered drive shaft; whereby said mounting of the propellers avoids significant reaction of propeller wash with the vehicle body and the tracks.

2. A vehicle as in claim 1, wherein the vehicle is equipped with conventional land vehicle speed and steering controls, said controls serving also as the speed and steering controls of the vehicle during its operation in the water.

3. An amphibious motor vehicle equipped with conventional land vehicle speed and steering controls, said controls serving also as the speed and steering controls of the vehicle during its operation in the water, propulsion means to provide land locomotion comprising an endless track on each side of the vehicle, a drive sprocket for each track in engagement with its track and mounted on the side of and adjacent one end of the vehicle, an engine and a transmission drivingly connecting the engine and the tracks; a propulsion device for each side of the vehicle mounted in close proximity to a drive sprocket for selective forward or rearward thrust and comprising a nozzle-propeller, drive means connecting the nozzle-propeller with its associated sprocket and comprising a planetary gear set of which the ring gear is concentric and coaxial with its associated drive sprocket, and including a keyed tapered drive shaft; whereby said mounting of the propellers avoids significant reaction of propeller wash with the vehicle body and the tracks.

* * * * *